United States Patent
Carroll

(10) Patent No.: US 8,082,446 B1
(45) Date of Patent: Dec. 20, 2011

(54) SYSTEM AND METHOD FOR NON-REPUDIATION WITHIN A PUBLIC KEY INFRASTRUCTURE

(75) Inventor: Christopher Carroll, Round Rock, TX (US)

(73) Assignee: Media Sourcery, Inc., Austin, TX (US)

( * ) Notice: Subject to any disclaimer, the term of this patent is extended or adjusted under 35 U.S.C. 154(b) by 1024 days.

(21) Appl. No.: 11/948,477

(22) Filed: Nov. 30, 2007

Related U.S. Application Data

(60) Provisional application No. 60/861,857, filed on Nov. 30, 2006.

(51) Int. Cl.
*H04L 9/32* (2006.01)

(52) U.S. Cl. ........................................ 713/176

(58) Field of Classification Search .................. None
See application file for complete search history.

(56) References Cited

U.S. PATENT DOCUMENTS

| | | | |
|---|---|---|---|
| 6,226,618 B1 * | 5/2001 | Downs et al. ............... 705/51 |
| 6,760,752 B1 * | 7/2004 | Liu et al. .................... 709/206 |
| 7,171,559 B1 * | 1/2007 | Bao et al. .................... 713/169 |
| 2003/0014631 A1 * | 1/2003 | Sprague ...................... 713/168 |
| 2007/0260887 A1 * | 11/2007 | Ito ............................... 713/186 |

* cited by examiner

*Primary Examiner* — Kaveh Abrishamkar
*Assistant Examiner* — Nadia Khoshnoodi
(74) *Attorney, Agent, or Firm* — Sprinkle IP Law Group

(57) ABSTRACT

Embodiments of the disclosure provide systems, methods, and computer readable instructions for non-repudiation communications, including provisions for non-repudiation of the identities of the sender and receiver, non-repudiation of the information sent and the information received, the time that various portions of the transaction or communication occurred, and other parameters associated therewith. Embodiments of the disclosure can be readily implemented in conjunction with public key systems to advantageously provide complete non-repudiation of origin and delivery of digital data.

20 Claims, 13 Drawing Sheets

500

| REFERENCE NUMBER | ITEM NAME | ORIGIN | ENCRYPTED OR SIGNED WITH |
|---|---|---|---|
| 518 | Second Data File | Receiver | Private Key of Receiver (and of Sender) |
| 520 | First Hash Time-Stamp | System | Not Applicable |
| 522 | Second Encrypted Hash | Receiver | Private Key of Receiver |
| 524 | Second Hash Time-Stamp | System | Not Applicable |
| 526 | Third Session Key Validation File | Receiver | Private Key of Receiver |
| 528 | First User Validation File | System | Not Applicable |
| 530 | Second User Validation File | Receiver | Private Key of Receiver |

400

| REFERENCE NUMBER | ITEM NAME | ORIGIN | ENCRYPTED OR SIGNED WITH |
|---|---|---|---|
| 402 | First Data File | Sender | Session Key |
| 404 | Hash | Sender | One-Way Function |
| 406 | First Encrypted Hash | Sender | Private Key of Sender |
| 408 | First Session Key | Sender | Public Key of Sender |
| 410 | Second Session Key | Sender | Public Key of Receiver |
| 412 | First Session Key Validation File | Sender | Private Key of Sender |
| 414 | Second Session Key Validation File | Sender | Session Key |
| 416 | Encrypted Public Key of Receiver | Sender | Private Key of Sender |

| REFERENCE NUMBER | ITEM NAME | ORIGIN | ENCRYPTED OR SIGNED WITH |
|---|---|---|---|
| 518 | Second Data File | Receiver | Private Key of Receiver (and of Sender) |
| 520 | First Hash Time-Stamp | System | Not Applicable |
| 522 | Second Encrypted Hash | Receiver | Private Key of Receiver |
| 524 | Second Hash Time-Stamp | System | Not Applicable |
| 526 | Third Session Key Validation File | Receiver | Private Key of Receiver |
| 528 | First User Validation File | System | Not Applicable |
| 530 | Second User Validation File | Receiver | Private Key of Receiver |

*FIG. 5*

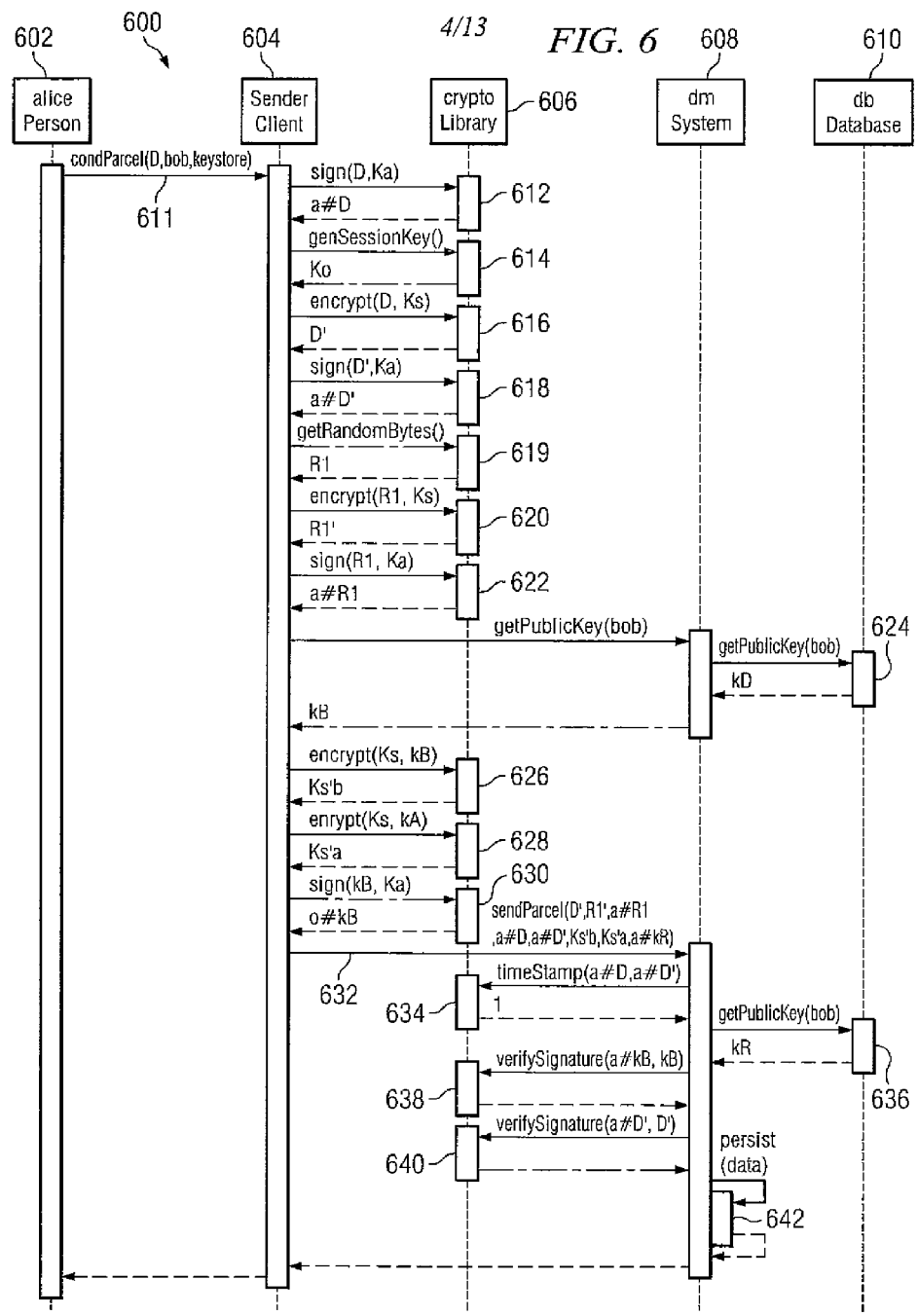

800

| SYMBOL | REFERENCE NUMBER | ITEM NAME |
|---|---|---|
| Ks | | Session Key |
| Ka | | Private Key of Sender (Alice) |
| Kb | | Private Key of Receiver (Bob) |
| kA | | Public Key of Sender (Alice) |
| kB | | Public Key of Receiver (Bob) |
| D | | Data in plain text (the document(s) in parcel) |
| D' | 402 | Data encrypted (with Session Key) |
| a#D | 404 | Alice's signature of plain text Data |
| a#D' | 406 | Alice's signature of encrypted Data |
| R1 | | Random bytes |
| R1' | 414 | Random bytes encrypted (with Session Key) |
| a#R | 412 | Alice's signature of Random bytes |
| Ks'b | 410 | Session Key encrypted (with Bob's public key) |
| Ks'a | 408 | Session Key encrypted (with Alice's public key) |
| a#kB | 416 | Alice's signature of Bob's public key |
| T | 520/524 | digital timestamp |
| R2 | 528 | Random bytes |
| R2' | | Random bytes encrypted (with a public key) |
| R2c | 530 | Random bytes decrypted (with client private key) |
| b#D | 522 | Bob's signature of plain text Data |
| b#D' | 518 | Bob's signature of encrypted Data |

*FIG. 8*

SYSTEM AND METHOD FOR NON-REPUDIATION WITHIN A PUBLIC KEY INFRASTRUCTURE

CROSS-REFERENCE TO RELATED APPLICATIONS

This application claims priority under 35 U.S.C. §119(e) to U.S. Provisional Application No. 60/861,857, filed Nov. 30, 2006, entitled "SYSTEM AND METHOD FOR NON-REPUDIATION WITHIN A PUBLIC KEY INFRASTRUCTURE," which is incorporated herein as if set forth in full.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

Embodiments of the disclosure relate generally to data security and more particularly to a system and method for communication verification within a public key infrastructure.

BACKGROUND

As the digital age progresses, the use of electronic transmission and storage of data has become the norm for many users. Particularly in electronic communications, email has played an ever-increasing role. However, without proper security and privacy measures, this increased importance of email can lead to severe consequences. An information security infrastructure can be useful in providing the confidentiality, integrity and availability of information, which are the main concerns of many individuals as well as entities such as businesses, universities, hospitals, and so on who have a greater need for secure data transmission, storage and maintenance.

Currently, Public Key Infrastructure (PKI) systems enable users to exchange data securely and privately over a network such as the Internet or an intranet through the use of a public and a private cryptographic key pair that may be obtained and shared through a trusted third party authority. The public key cryptography, also known as asymmetric cryptography, is perhaps the most common method on the Internet for authenticating a message sender or encrypting a message. A PKI system has the following features:

One or more trusted third party certificate authorities (CAs)—a CA is an organization that issues digital certificates;

Digital certificates—these are electronic credentials, each of which identifies an individual or an organization and which includes the public key or information about the public key;

One or more registration authorities (RAs)—an RA is an entity that is responsible for identification and authentication of digital certificates but does not sign or issue digital certificates as it is delegated with certain tasks on behalf of an authorized CA;

One or more directory services that can store and, when necessary, revoke the digital certificates; and A certificate management system.

In the public key cryptography, a public key and a private key are created simultaneously using the same algorithm provided by a CA. The public key is made publicly available as part of a digital certificate in a directory that all parties can access. The private key is not meant to be shared with anyone or sent across an unsecured network such as the Internet.

As an example, User A can obtain (from User B, a public directory, a network administrator, etc.) User B's public key, encrypt a message using User B's public key, and sends User B the encrypted message over an unsecured network. When User B receives the encrypted message, User B can decrypt the encrypted message using his private key which was created with the public key used by User A to encrypt the message. In addition to encrypting messages to ensure privacy, User A can authenticate herself by using her private key to encrypt a digital certificate or signature. When User B receives the digital certificate, User B can decrypt the encrypted digital certificate using User A's public key. This proves to User B the identity of the sender (i.e., User A).

Despite the benefits provided by electronic communications systems and methods, and more particularly communications systems which rely on PKI, room for improved systems and methods of secure communication exists.

SUMMARY OF THE DISCLOSURE

Many legislative bodies now require PKI for digital signatures and encryption in an enterprise setting. Non-compliance violations can have severe consequences. As a result, there is a growing demand for PKI solutions which can ensure that the identity of the person, application or device that sends or receives an exact set of data at an exact point of time is irrefutably verifiable and unspoofable. However, as the above example illustrates, current PKI systems have several security weaknesses.

More specifically, the encrypted digital signature is neither tied to the encrypted message nor to the time at which the message is sent. Thus, the authentication could be spoofed. Moreover, existing PKI systems are typically complicated to install and difficult to support.

In addition, the sender of information has several concerns. First, the sender and receiver (e.g. user A and user B) are typically concerned that the receiver, and only the receiver, is able to read the sent information. They also typically share a concern that the information be delivered to the receiver uncorrupted. Because the information is signed by the sender, the integrity of the data can be confirmed by the receiver. But the sender has no such assurance. In some cases, a receiver does in fact receive the information in an uncorrupted condition and yet claims otherwise. In such cases, the sender would need to prove that what the sender originally claimed to have sent was indeed sent. Additionally, the sender would need to prove this fact without any reliance on the receiver. The receiver might not retain information or allow access to the receiver's private key to assist the sender in proving the sender's contentions.

The receiver, too, has similar concerns. The receiver may wish to be able to access the information without acknowledging the receipt of the information until the receiver knows that the receiver can indeed access the information. If the sender claims that the sender sent something other than what the receiver actually received, the receiver also needs the ability to prove that the sender is incorrect. As with the sender wanting to be sure that the information only goes to the receiver, the receiver wants to be certain the that information actually came from the sender. Additionally, the parties, and perhaps others, may want to know when the various steps of the transaction occur and what transpired. In the context of digital security, non-repudiation means that it can be verified that the sender and the recipient were, in fact, the parties who claimed to send or receive the message, respectively. More specifically, non-repudiation of origin proves that data has been sent, and non-repudiation of delivery proves it has been received.

Embodiments of the disclosure provide a system and method for non-repudiation communications including provisions for non-repudiation of the identities of the sender and receiver, non-repudiation of the information sent and the information received, the time that various portions of the transaction (or communication) occurred, and other parameters associated with the communication. Embodiments of the disclosure can be readily implemented on public key systems to advantageously provide complete non-repudiation communications. The necessary programming and networking languages, techniques, and equipment are known to those skilled in the art.

In some embodiments, a method is provided in which a service provider facilitates communication between a sender and a receiver of a message which includes information (or content) the security of which one, or both, of the sender, receiver, or both wish to maintain. In the method, the sender creates the message and a "parcel" with which to deliver it. The parcel may contain the following items: the encrypted data file, a one-way hash of the data file, an encrypted copy of the hash, two differently encrypted copies of the session key, two copies of a file to be used to verify the session key (each copy encrypted differently), and an encrypted copy of the receiver's public key. As will be described herein, these items allow the sender to prove that the sender sent the data file after properly encrypting it with the session key that the sender sent the receiver. The sender can also prove whether the receiver received and decrypted the data file or is falsely alleging otherwise. Likewise, the receiver can prove whether the receiver received the data file and the proper session key sent by the sender. The receiver can also prove whether the sender properly encrypted the data file and the corresponding session key. Additionally, the identities of the sender and the receiver can also be proved by each party. For instance, using the encrypted public key of the receiver, the service provider can validate the identity of the receiver. The system may also verify that the sender sent the parcel by comparing the two versions of the hash in the parcel. If any discrepancies occur during the transaction, the service provider may refuse to further process the transaction and generate appropriate warnings and notifications.

The service provider may also verify that the sender intended to send the session key to the receiver designated by the sender. To do so, the service provider may forward the encrypted session key to the receiver. Since this copy of the session key was encrypted with the receiver's public key, only the receiver should be able to decrypt the copy. Thus, the service provider may verify that the receiver decrypted the session key by, for instance, requiring the receiver to decrypt the encrypted key validation file (with the session key) and return the results before allowing further processing of the transaction. If, the receiver has succeeded in returning the key validation file, then the service provider can release the encrypted data file to the receiver. However, to provide the sender assurance that the receiver receives and decrypts the data file successfully, the service provider may also require that the receiver prove that the receiver did so. In some embodiments, the receiver must therefore return the unencrypted data file to the service provider as proof of success.

However, in some embodiments, where it is desired that the security of the data file be maintained, even from the service provider, other proof can be required of the receiver. For instance, the receiver may be required to encrypt (with the receiver's private key) a copy of the encrypted data file which was sent to the receiver. Additionally, the receiver may be required to return a hash (using the same one-way hash function that the sender used to generate the hash) encrypted with the receiver's private key. Thus, the service provider can match the data file that was sent with the data file that was received and verify (by comparing the hashes) that the contents of the data file were successfully delivered.

In some embodiments, a system is provided which can facilitate non-repudiation communications. Through cryptography and other processes described in more detail herein, the system of the current embodiment acts as a broker between the sending and receiving parties. These parties usually desire that they will agree on the data that was actually sent and received and on who sent it and who received it. When a disagreement arises, however, the system allows the party who is correct access to enough information to prove what data was actually sent (or received) and who sent (or received) it. Optionally, the sender can choose to encrypt the data being sent. When encrypted delivery is chosen, the delivery transaction produces metadata that assures the integrity of the delivery process in general and the encrypted data file in particular.

In some embodiments, the system does not have the ability to determine the contents of the message it delivers. For example, the data to be delivered is converted into a form accessible only by the receiver. In this embodiment, to allow the individual parties to prove either the transmission or receipt of the information, the parties may be required to digitally sign particular pieces of information at various stages in the transaction in order to advance to the next stage of the transaction. These pieces of information can be retained by the system so that in the case where the parties do disagree, the retained information can be used by the parties to prove or disprove each other's allegations. Once the parties sign an agreement on the result of the transaction much, if not all, of the information retained during the transaction may be deleted.

As the foregoing demonstrates, embodiments of the disclosure allow the sender to mathematically prove that the sender sent the data file properly encrypted with the session key and can prove that the receiver received the properly encrypted data file and the proper session key with which to decrypt it. Moreover, the sender can do so without any cooperation from the receiver including doing so without the receiver's private key. Likewise, the receiver can prove that the sender sent a corrupted (or incorrect) data file, an incorrect session key, or an improperly encrypted data file. Again, the receiver can do so without needing the sender's private key. Furthermore, embodiments disclosed herein allow the content of the data file to remain secure while providing these other advantages. Accordingly, the parties to the transaction may enjoy secure and verifiable communications in accordance with embodiments of the disclosure.

Thus, from a sender's perspective, embodiments of the disclosure provide several advantages. First, senders may be assured of receiving credit for successfully sending information to a recipient when they have in fact done so. Furthermore, the senders may demonstrate their success with, or without, the cooperation of the receivers. Moreover, the senders may demonstrate their success without compromising the security of the information which they sent. From a receiver's perspective, embodiments of the disclosure provide advantages also. For instance, a receiver may be assured of receiving credit for the information which they received whether it is consistent with the information which the sender sent. For another example, receivers may demonstrate that the received information was inconsistent with the information that was sent and do so with, or without, the sender's cooperation and without compromising the security of the data sent (and received).

BRIEF DESCRIPTION OF THE DRAWINGS

A more complete understanding of the present invention and the advantages thereof may be acquired by referring to the following disclosure, taken in conjunction with the accompanying drawings in which like reference numbers indicate like features and wherein:

FIG. 4 is table which summarizes a parcel constructed in accordance with an embodiment of the disclosure;

FIG. 5 is a table which summarizes a data structure constructed in accordance with an embodiment of the disclosure;

FIG. 6 is a flowchart illustrating a method practiced in accordance with an embodiment of the disclosure;

FIG. 8 is a table summarizing pieces of information constructed in accordance with an embodiment of the disclosure.

DETAILED DESCRIPTION

Preferred embodiments of the disclosure are illustrated in the FIGURES, like numerals generally being used to refer to like and corresponding parts of the various drawings. Embodiments of the disclosure provide systems, apparatus, and methods for verifying communications.

Figure 1:
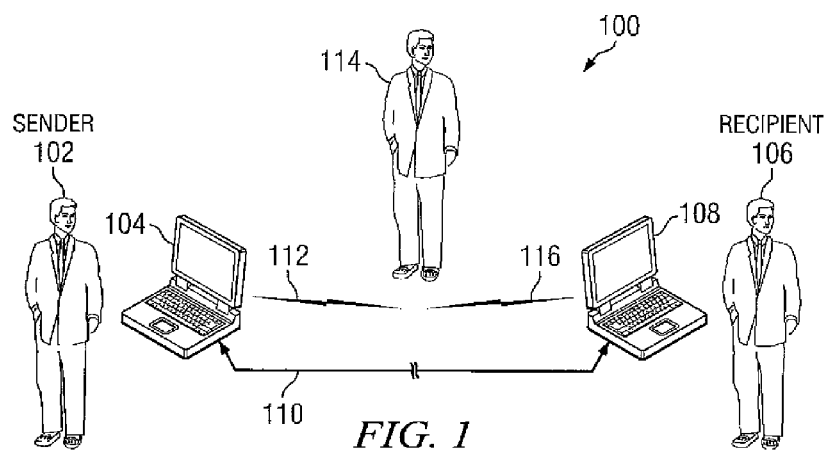
FIG. 1 is a schematic diagram illustrating a communication system of the prior art.

FIG. 1 illustrates a prior art communications system 100 that enables the exchange of information between sender 102 and receiver 106 via communication devices 104 and 108. Examples of devices 104 and 108 may include personal computers, blackberries, personal digital assistants, JAVA enabled devices, etc. Devices 104 and 108 may be connected over a local area network, wide area network (e.g., the Internet), or other communications link 110 (e.g., a wireless communication or telephony system). In FIG. 1 eavesdropper 114 may intercept message 112 sent from sender 102 to receiver 106. Eavesdropper 114 may alter the contents of the message 112 for malicious or arbitrary reasons. Noise, system 100 malfunctions, errors on the part of parties 102 and 106, etc. may also cause differences between the transmitted communication 112 and as-received message 116. Thus, in general, message 112 may be altered to become message 116 as-received by receiver 106.

In some cases, one or both of the users 102 and 106 may assert that they either sent message 112 (which, in fact, they did not send) or that they did not receive message 112 (when, in fact, they did). In some cases, one of parties 102 or 106 may alter message 112 so that message 116 has different content than original message 112. In these cases, it can be quite difficult to discern the truth of what happened. When the message 112 or 116 are encrypted, the situation can be even more difficult because only the party(s) with the key to decrypting the messages 112 and 116 can examine the actual content in question to determine what transpired. In these types of situations, party 102 or 106 might assert that message 112 was altered, was never sent, or never received and is said to repudiate the communication or transaction.

Figure 2:
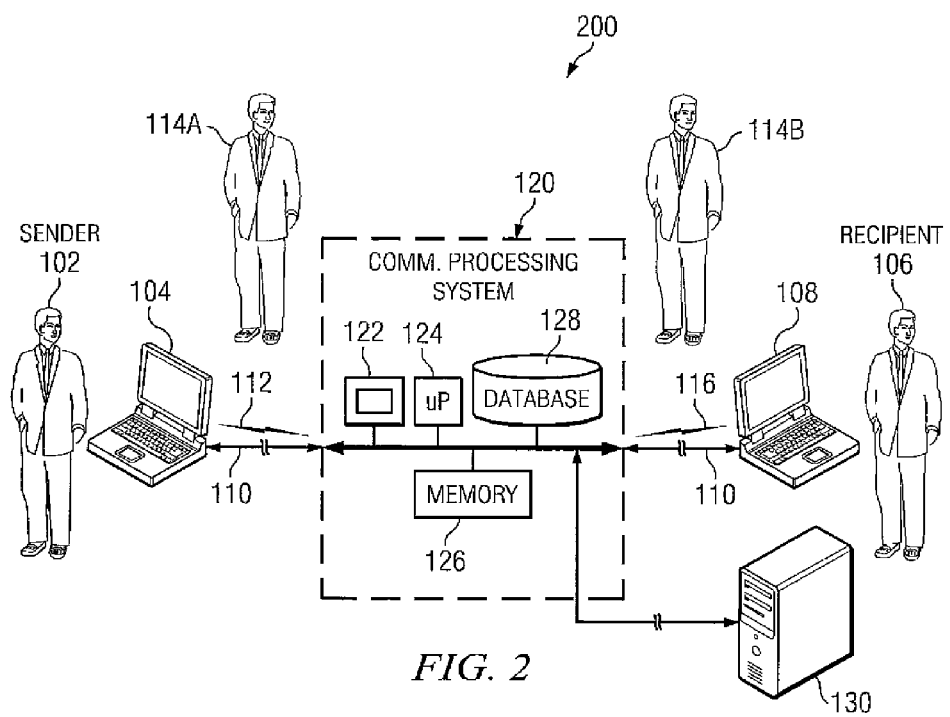
FIG. 2 is a schematic diagram illustrating a communication system in accordance with an embodiment of the disclosure.

FIG. 2 depicts an embodiment for facilitating non-repudiated communications between parties 102 and 106. More particularly, system 200 may be configured to act as a broker for providing non-repudiation of communications between sender 102 and receiver 106. In some embodiments, system 200 may cause information to be generated such that when there is disagreement between parties 102 and 106 regarding the communication, either or both parties 102 and 106 may have all of the information necessary to prove his or her assertions.

In some embodiments, sender 102 can choose to encrypt message 112 which sender 102 desires to send. When encryption is chosen, system 200 can provide a number of assurances about the integrity of the transaction. Many of these assurances may also be provided for unencrypted messages. Thus, message 112 can be converted into a form which is only accessible by receiver 106 and still be delivered by system 200. In some embodiments, system 200 may lack the ability to determine the contents of message 112. In this context, system 200 can mathematically prove what actually happened when receiver 106 claims that message 112 that was delivered is not the same as message 112 that was sent.

In some embodiments, system 200 requires parties 102 and 106 to digitally sign particular pieces of information at various stages in the transaction in order to advance to the next stage of the transaction. Some embodiments require that certain pieces of information be retained by system 200 so that in cases where parties 102 and 106 do disagree, the retained information can be used by parties 102 and 106 to prove or disprove their allegations. This retained information can be stored until parties 102 and 106 "sign" an agreement on the result of the transaction. After which, the received data may be deleted.

In system 200, computer or server 120 is disposed in the communication link 110 between parties 102 and 106. Computer 120 can include some form of removable memory device 122 (e.g., a compact disc drive), processor 124, memory 126, and (in this case) database 128 stored in memory 126 (but shown here separately for illustrative purposes). In some embodiments, computer 120 may be in communication with public key server 130 although it need not be. Disc drive 122 may hold instructions on removable computer readable media that, when read and executed by processor 124, allow processor 124 to operate computer 120. Memory 126 can be a hard drive to hold information (including the instructions) for ready access by processor 124. More particularly, memory 126 can contain database 128 which stores the various pieces of information associated with the messages 112 and 116 that enable each party 102 and 106 to prove that they either sent or received message 112 and 116 which they claim to have sent or received.

In some embodiments, processor 124 may communicate with server 130 to obtain information related to messages 112 and 116 such as, for instance, the public keys for parties 102 and 106. However, in some embodiments of the disclosure, system 200 possesses the ability to generate public/private key pairs without relying on server 130 or indeed on an external PKI system. Such embodiments are disclosed in co-owned, co-pending U.S. patent application Ser. No.

11/948,512, filed Nov. 30, 2007, entitled "SYSTEM AND METHOD FOR SIMPLIFIED PUBLIC KEY INFRASTRUCTURE ARCHITECTURE AND IMPLEMENTATION," which is incorporated herein by reference.

Figure 3:
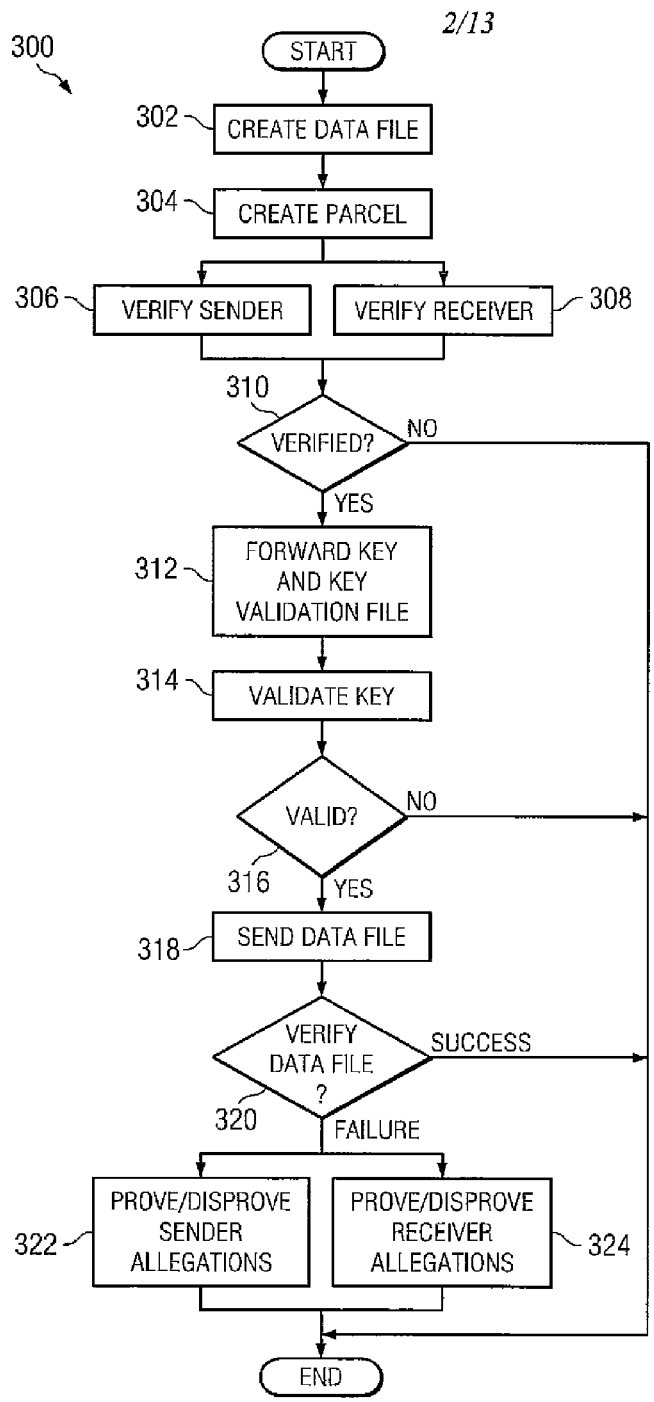
FIG. 3 is a flowchart which schematically illustrates a method in accordance with an embodiment of the disclosure.

In some embodiments, a message involving a data file (e.g., message itself or an attachment) may be processed according to method 300 illustrated by FIG. 3. If the data file has not been created, sender 102 may do so as shown at step 302. The data file may be any type of file including, but not limited to, an e-mail message, an attachment, a text file, a spreadsheet file, a graphics file, a video file, an image file, an application, etc. At step 304, sender 102 can create a parcel with which the data file will be processed in order to deliver the data file to receiver 106. In some embodiments, creation of the parcel is largely automated.

The identities of sender 102 and receiver 106 may then be verified using information in the parcel along with certain publicly available information (e.g., the public keys of sender 102 and receiver 106) at operations 306 and 308 respectively. If both parties 102 and 106 are successfully verified, the method 300 may proceed. Otherwise, processing of the data file may terminate as shown at operation 310.

In some embodiments, with the identities of parties 102 and 106 verified, the method 300 may continue by forwarding an encrypted copy of a session key to receiver 106 at step 312. Along with the session key, a key validation file may also be sent to the receiver (see step 312). If receiver 106 is able to decrypt the session key validation file (and prove it), then the session key sent to receiver 106 is deemed to be valid and processing may therefore continue (see step 316). If not, processing may be discontinued. With the session key validated, the encrypted data file may be forwarded to the receiver at step 318. However, in some embodiments, mere delivery of the encrypted data file, though, does not necessarily mean that receiver 106 will be able to decrypt it successfully. Nor does delivery of the data file, in some embodiments, necessarily mean that sender 102 sent the correct file, encrypted it correctly, or sent it with the same session key which sender 102 supposedly also sent to receiver 106. Thus, the method 300 may also require that receiver 106 provide certain pieces of information after decrypting the data file D. If receiver 106 cannot, or will not, produce this proof then the communication may be deemed to have failed at step 320. Thus, at steps 322 and 324, an examination of the information trail created at various steps in the method 300 makes it possible to determine when the failure occurred. This is so even without assistance from one, or the other, of parties 102 and 106 or access to the unencrypted contents of the data file. Otherwise (that is, if receiver 106 did indeed provide proof of the information that receiver 106 actually received and decrypted), the transaction may be deemed a success at step 320. Either way, appropriate notifications can be sent to parties 102 and 106 and the success or failure of the transaction may be recorded for future reference.

FIG. 4 summarizes one embodiment of parcel 400 which sender 102 may create in step 304 of FIG. 3. Parcel 400 of FIG. 4 can include: first data file 402, hash of unencrypted data file 404, first encrypted version of the hash 406, first session key 408, second version of the session key 410, first session key validation file 412, second version of the session key validation file 414, and encrypted version of the public key of the receiver 416. FIG. 5 summarizes other pieces of information which may be created during the transaction in accordance with some embodiments. The other pieces of information 500 created during the processing of the message in some embodiments can include second version of the data file 518, first hash time-stamp 520, second encrypted version of the hash 522, second hash time-stamp 524, third version of the session key validation file 526, sender validation file 528, and second version of the user validation file 530.

These pieces of information 402, 404, 406, 408, 410, 412, 414, 416, 518, 520, 522, 524, 526, 528, and 530 may include two versions of the data file, an unencrypted hash of the data file, two encrypted versions of the hash, two time-stamps related to the encrypted hashes, two versions of the session key, three versions of a session key validation file, an encrypted version of the receiver's public key, and two versions of a user validation file. In some embodiments, many of these pieces of information 402, 404, 406, 408, 410, 412, 414, 416, 518, 520, 522, 524, 526, 528, and 530 are "versions" of some other piece of information because changes may occur to the underlying piece of information between versions.

Figure 7:
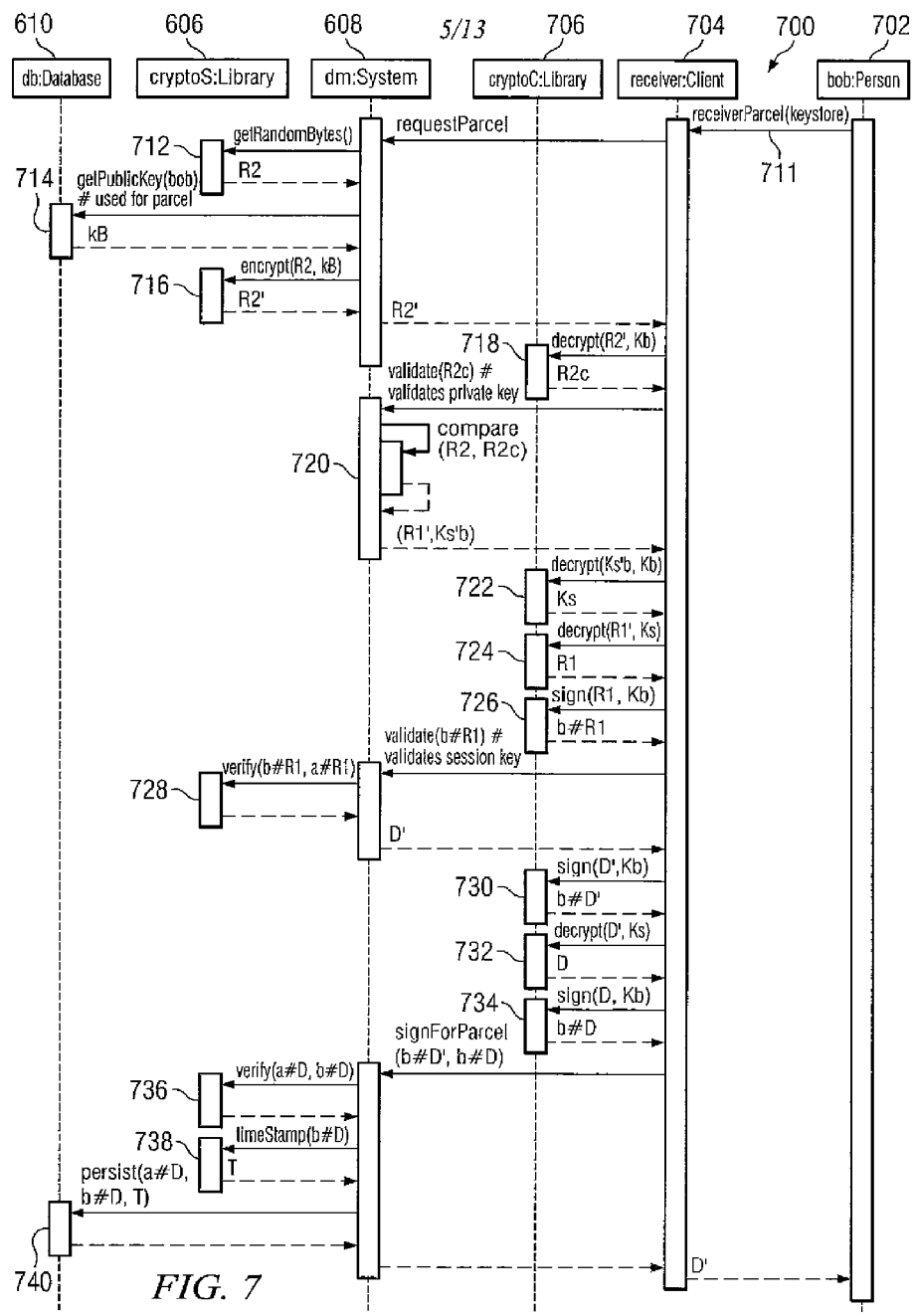
FIG. 7 is a flowchart illustrating a method practiced in accordance with an embodiment of the disclosure.
Figure 9:
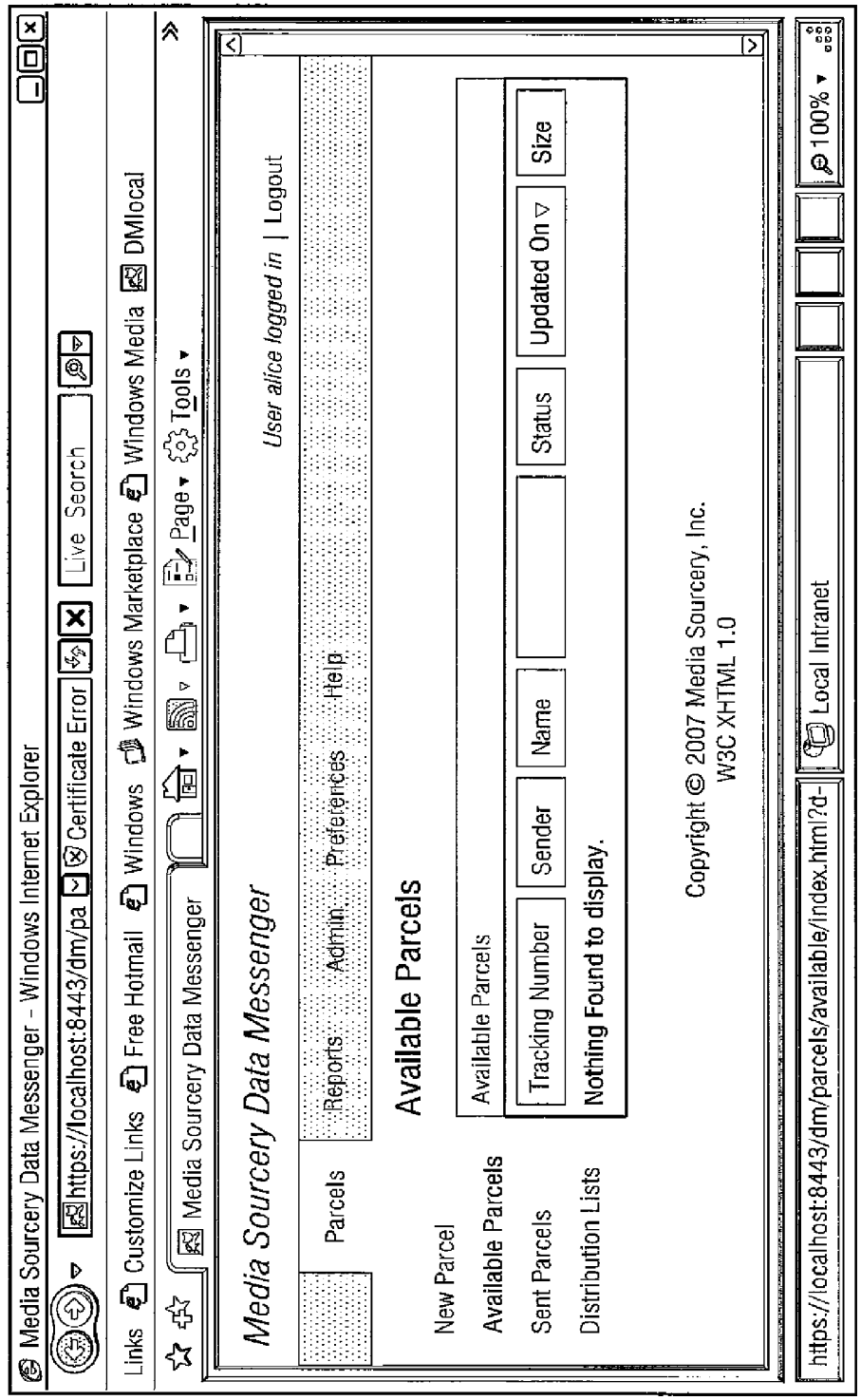
FIGS. 9-15 are screenshots of a graphical user interface (GUI) constructed in accordance with an embodiment of the disclosure.

With reference now to FIG. 6, an automated method 600 for sending data file D in accordance with some embodiments is illustrated. FIG. 6 and FIG. 7 (to be discussed below) may be read in conjunction with table 800 shown in FIG. 8 which correlates the pieces of information shown in summaries 400 and 500 and certain mathematical terms which can be used to denote these pieces of information. Sender 602 and the receiver 702 of the data file are referred to, at times, as "Alice" and "Bob," respectively, in keeping with a common practice in the art. As such, these names are not intended to limit the disclosure in any fashion. Many of the mathematical terms may be designated with terms corresponding to "Alice" and "Bob" and that include "A", "a", "B", and "b." FIG. 6 also shows that certain entities (i.e., sender 602, receiver 702 of FIG. 7, software modules, and hardware items) can be involved in the process. FIG. 6 also shows sender 602, client 604 (i.e., the sender's computer) associated with sender 602, cryptography library 606, system 608, and database 610. In some embodiments, sender's client 604 can be used to generate, or designate, data file(s) D involved in the transaction as well as to automate many of the actions associated with the sending of data file D to receiver 702. For instance, crypto library 606 may be used to generate cryptographic keys and to perform other cryptographic functions. System 608 may be used in some embodiments as an intermediary, broker, escrow agent, or service provider for processing data file D and the information summarized in FIGS. 4-5 and 8. Furthermore, system 608 may be a software module, program, application, or other entity capable of processing the transaction. Database 610 may be used to store information that may be received as well as information that may be generated during the processing of transactions.

FIG. 6 depicts, that to send data file D, sender 602 may begin by designating, at step 611 (via sender's client 604), the data file(s) D which sender 602 desires to send. Note that in some embodiments, certain actions may be attributed to sender 602. However, these actions may be executed by client 604 instead of sender 602 without departing from the scope of the disclosure. That being said, in addition to data file D, sender 602 can provide a password (here "keystore") to access sender's keystore which may be stored on client 604. Client 604 can be configured to respond to sender's designation of data file D by accessing crypto library 606 to create parcel 400 for processing data file D.

In some embodiments, crypto library 606 can be used to create one-way hash a#D (or checksum) of data file D at step 612. To do so, client 604 may send crypto library 606 a request to sign data file D (that is, to create hash a#D) along with data file D and sender's private key Ka. Crypto library 606 can then perform the one-way hash on data file D and return results a#D to client 604. Since hash a#D has been signed with sender's 602 private key Ka, the value it produces can be used in some embodiments to verify that sender 602 (here for example Ann) did sign and send any subsequent hashes which purport to have been created from data file D by sender 602. Thus, in some embodiments, hash a#D can be used to represent what sender 602 claims to be sending to receiver 702. Subsequently, receiver 702 can also hash data file D and compare the result to sender's hash a#D to verify whether the contents of delivered data file D match the contents of data file D as it was sent by sender 602.

Additionally, client 604 can send to crypto library 606 (at step 614) a request for session key Ks. In some embodiments, session key Ks is symmetrical such that any receiver 702 of files encrypted with session key Ks can decrypt those files if they have session key Ks. In some embodiments, this feature allows intended receiver 702 to decrypt data file D' if all parties 602 and 702 involved act as they purport to have acted (e.g., sender 602 sends the correct parcel and receiver 702 correctly decrypts the actual data file D' sent in the parcel). At step 616, client 604 can also send a request to crypto library 606 to encrypt data file D with session key Ks. In some embodiments, system 608 need not have access to session key Ks so that the security of data file D is preserved even from system 608.

In some embodiments, client 604 can also be configured to send a request to crypto library 606 to encrypt (already encrypted) hash a#D with sender's private key to arrive at doubly encrypted version a#D' of hash a#D. This feature allows others to decrypt encrypted hash a#D to arrive at hash a#D. It also allows sender 602 to attest that data file D' was sent and was encrypted with session key Ks (see step 618). In some embodiments, client 604 can be configured to generate a session key validation file at step 619. The session key validation file can be a file of randomly generated data that is about the size of data file D. Accordingly, the session key validation file will be referred to as "random data" R1 hereinafter although session key validation file R1 could be any type of data. In some embodiments, random data R1 can be used to allow receiver 702 to prove that receiver 702 did not receive the proper session key Ks.

Client 604 can also be configured, in some embodiments, to create the remaining portions of parcel 400. For example, client 604 can create the two versions R1' and a#R1 of encrypted random data R1. FIG. 6 depicts that one version of random data R1' may be encrypted with session key Ks and the other version a#R1 of random data R1 can be encrypted with sender's 602 private key Ka at steps 620 and 622 respectively. Thus, the first version of encrypted random data R1' can be decrypted by any entity with access to session key Ks (e.g., intended receiver 702). For instance, receiver 702 can do so to show what the contents of random data R1 (that sender 602 sent) were without the cooperation of sender 602.

In step 624, of some embodiments, client 604 can retrieve receiver's public key (here for example Bob's public key kB) for subsequent use in encrypting session key Ks (at step 626) to produce one of the encrypted versions of session key Ks'b. The only entity who can decrypt this version of session key Ks'b, in some embodiments, is the receiver (i.e., here, Bob who is the only one with his private key Kb which is required to perform this decryption). Client 604 may also be configured to request that crypto library 606 encrypt session key Ks with sender's public key kA at step 628 to produce the other encrypted version ks'a of session key Ks. This piece of information Ks'a may be retained and used if a dispute regarding the transaction occurs. In some embodiments, this encrypted version Ks'a of session key Ks allows sender 602 (without cooperation from receiver 702) to reproduce session key Ks that sender 602 sent with parcel 400 (see step 628).

In some embodiments, client 604 can be configured to request that crypto library 606 encrypt public key kB of intended receiver 702 with private key Ka of sender 602 to produce encrypted version a#kB of the receiver's public key kB of step 630. Thus, in some embodiments, this feature of parcel 400 allows system 608, and others (using the sender's public key kA), to determine to whom sender 602 actually attempted to send data file D.

Next, In some embodiments, client 604 shown in FIG. 6 can assemble parcel 400 and send it (including hash a#D of the unencrypted data file D, first encrypted version of hash a#D', first session key Ks'a, second version of session key Ks'b, first session key validation file a#R1, second version of session key validation file R1', encrypted version of public key of receiver a#kB, and data file D') to system 608 at step 632. In one embodiment, after doing so, sender 602 has purportedly completed sender's 602 portion of the transaction. In some embodiments, after doing so, sender 602 purports to have sent data file D encrypted with session key Ks to intended receiver 702. Because sender 602 or receiver 702 might repudiate their activities with respect to the transaction, system 608 can be configured, in some embodiments, to allow either party or both parties 602 and 702 to determine what transpired during the transaction. Indeed, by sending parcel 400 instead of just encrypted data file D' (and session key Ks), sender 602 may be attesting that 1) encrypted data file D' is the encrypted form of the contents of data file D that produced hash a#D and 2) that session key Ks was encrypted with receiver's public key kB to produce the encrypted session key Ks'b.

In step 634, the hash of data file a#D and sender's signature a#D' of hash a#D can be time-stamped in some embodiments. Thus, without revealing the contents of data file D, system 608 can create a record of what sender 602 purports represents the contents of the data file (hash a#D) and sender's signature of that attestation (hash a#D'). System 608 also verifies sender's signature a#kB of intended receiver's public key kB in step 636 of some embodiments. To do so, system 608 can retrieve public key kB corresponding to receiver 702 which sender 602 indicated was intended receiver 702 at step 611. Then, in step 638 of one embodiment, system 608 can request that crypto library 606 decrypt sender's signature a#kB of receiver's public key kB. If the results of the decryption do not match known public key kB of receiver 702 then either, an error (unintended or otherwise) associated with the identity of intended receiver 702 or the identity of sender 602 has been detected. Thus, all further processing of the transaction can be stopped and appropriate notifications can be sent out. If the results agree with known public key kB of receiver 702, processing can instead continue.

In some embodiments, sender's signature a#D' of D' (of encrypted data file D) can be decrypted with public key of sender kA by system 608 in step 640 of some embodiments. If the results of step 640 do not match hash a#D which sender 602 sent with parcel 400, then an error associated with hash a#D, encrypted data file D', or the identity of sender 602 has been detected. Accordingly, processing of the transaction can either be stopped or continued depending on the results of the decryption. If, however, both the verification of receiver's public key kB and the verification of hash a#D succeed, system 608 can save parcel 400 and attempt to deliver encrypted data file D' to receiver 702.

FIG. 7 depicts method 700 of securely delivering data file D in accordance with some embodiments. FIG. 7 also shows a delivery infrastructure 700 that can mirror sender's infrastructure of FIG. 6. The delivery infrastructure may include another client 704 (which may automate many of steps of receiving data file D), and separate crypto library 706. In some embodiments, arrangements other than the combined infrastructures of FIGS. 6 and 7 may be used to process transactions.

Method 700 may begin with system 608 notifying receiver 702 that parcel 400 is awaiting delivery to receiver 702. If receiver 702 desires to receive data file D, receiver 702 (at step 711) may request its delivery. Before sending receiver 702 any version data file D, in some embodiments, system 608 may create a user validation file with which to test whether the entity requesting data file D is indeed intended receiver 702. The user validation file can be similar to the session key validation file (i.e., random data R1). In some embodiments, the user validation file can contain a relatively small amount of random data. Thus, hereinafter, the user validation file is referred to as random data R2. In some embodiments, at steps 712 and 714, system 608 can obtain random data R2 and public key kB of receiver 702 indicated by sender 602 in step 611. System 608 may then have sender's crypto library 606 encrypt random data R2 with receiver's public key kB at step 716. Since the identity of sender 602 has been verified, but not the identity of the requestor, it is the sender's crypto library 606 that may be used at step 716. This use of the sender's crypto library 606 in some embodiments helps prevent spoofing of the transaction by means of preventing the interception the unencrypted contents of random data R2. Because only receiver 702 has receiver's private key Kb, only intended receiver 702 should be able to decrypt encrypted random data R2'. Encrypted random data R2' may then be sent to the requestor (here, presumably, receiver 702).

In some embodiments, the requestor must prove that the requestor is intended receiver 702 or at least be in possession of receiver's private key Kb which corresponds to the receiver's 702 public key kB (that sender 602 claims to have used in encrypting session key Ks'b). Since private keys Ka and Kb are generally held securely, success at this step means that the requestor is indeed intended receiver 702. In step 718, in some embodiments, method 700 therefore can require that the requestor decrypt encrypted random data R2'. To prove that the requestor did so, the method 700 may also require that the requestor send the decrypted random data R2c back to system 608. In step 720, the decrypted version of random data R2c returned by the requestor may then be compared to the original version of random data R2. If the two versions R2 and R2c of the random data differ, processing of the transaction can be stopped since the requestor is apparently not intended receiver 702.

Otherwise, transaction processing in accordance with method 700 may continue since the requestor has proven that the requestor is intended receiver 702. In some embodiments, system 608 can now attempt to deliver the encrypted session key Ks'b. However, to ensure that receiver 702 cannot successfully repudiate the delivery of session key Ks where receiver 702 did not act as he purports, method 700 may also require receiver 702 to prove that receiver 702 could use session key Ks to decrypt some data that was supposedly encrypted with session key Ks. In this context, system 608 may return to receiver 702 session key Ks'b (now decrypted and re-encrypted with the receiver's public key kB) and encrypted random data R1' (as-received from sender 602 and supposedly encrypted with session key Ks). See step 720.

If receiver 702 desires to proceed, receiver 702 may decrypt session key Ks'b using receiver's private key Kb (which only intended receiver 702 can do) as in step 722. Using decrypted version of session key Ks from step 722, receiver 702 can then decrypt random data R1' at step 724. At step 726, and to provide evidence whether receiver 702 received proper session key Ks, method 700 can require that receiver 702 sign random data R1 and return the result b#R1 to system 608 for comparison with signed random data a#R1 (as received from sender 602). Thus, in step 728, system 608 can retrieve the version of random data a#R1 signed by sender 602 (and stored in database 610) and decrypt both signed versions a#R1 and b#R1 of random data R1. These decryptions can be made possible because both versions a#R1 and b#R1 of the signed random data R1 were signed with private keys Ka and Kb of sender 602 and receiver 702. Accordingly, known public keys kA and kB of these parties 602 and 702 can be used by system 608 for the decryptions. If the two decrypted versions of random data a#R1 and b#R1 differ, an error related to either session key Ks or random data R1 has been detected as shown by step 728. In this context, processing of the transaction may cease.

In some embodiments, If the comparison was successful, method 700 may continue with the delivery of encrypted data file D' to receiver 702 (see step 728). Method 700 may require proof that the transaction has successfully progressed. For instance, method 700 may require receiver 702 to prove that receiver 702 received encrypted data file D'. Again, it may be desired to continue to safeguard the contents of data file D. Thus, instead of returning a copy of decrypted data file D (in some embodiments), method 700 may require that receiver 702 return signed copy b#D' of encrypted data file (as received from system 608) and hash b#D of unencrypted data file D. Receiver's client 704 can also request that crypto library 706 encrypt as-received data file D' with receiver's private key Kb in step 730. Even though system 608 could decrypt this version of data file b#D', doing so would not compromise the contents of data file D. Rather, in some embodiments, all that system 608 can recover from the returned version of data file b#D' is encrypted data file D' returned by receiver 702.

In some embodiments', receiver's client 704 can decrypt encrypted data file D' using session key Ks as shown at Step 732. Then, to attest to the information that system 608 actually delivered, receiver's client 704 can perform a one-way hash on decrypted data file D in step 734. Receiver's client 704 can also be configured to perform the same one-way hash as sender's client 604 performed so that, in some embodiments, the two versions of hash a#D and b#D (one from sender 602 and one from receiver 702) can be the same. Receiver's client 704 can then return newly encrypted version b#D' of as-received data file D' and hash b#D as calculated by receiver's client 704 thereby allowing receiver 702 to attest to the information that receiver 702 actually received.

At step 736, system 608 may then check the evidence of the transaction (i.e., hash b#D) to determine whether the delivery was successful. In some embodiments, system 608 compares hash a#D as calculated by sender 602 and hash b#D as calculated by receiver 702 (see step 736). If the two versions of hash a#D and b#D are equal the version of hash b#D received from receiver 702 can be time-stamped and saved in database 610 to record the time that the transaction ended successfully as shown by step 740. Subsequently, if a disagreement between what sender 602 claims sender 602 sent and what receiver 702 claims to have received arises, hash a#D generated by sender 602 (along with the fact that hash b#D produced by receiver 702 matches the sender's version of hash a#D) can help sender 602 prove the integrity of encrypted data file D' that sender 602 claims to have sent with parcel 400.

Otherwise, if the two versions of hash a#D and b#D differ, then failure of the transaction may be recorded in database 610, processing may be stopped, and the parties may be notified. In some embodiments, no data is deleted from the system when this failure occurs. One possible reason for not deleting the data is that receiver 702 has now apparently downloaded data file D', (in its correct form or not) and session key Ks to decrypt that data file D'. In the previously discussed transaction failures, receiver 702 apparently never received data file D' whether correct or not, and it is likely that no one will be claiming (or able to prove) that receiver 702 did receive data file D'. In contrast, if receiver 702 has apparently downloaded the data file D', the disagreement can go to whether or not sender 602 performed as sender 602 claims. Methods 600 and 700 allow the each party or both parties 602 and 702 to prove what actually happened despite the possible refusal of one party to cooperate (e.g., to provide private key Ka or Kb necessary to decrypt certain pieces of information generated during the transaction).

In some embodiments, corruption of data file D' can occur between when data file D' was stored by system 608 (e.g., in database 610) and when receiver 702 received data file D'. This corruption could cause hash a#D and b#D values to differ. As a result, it might initially appear that receiver 702 did not perform as receiver 702 claims. However, some embodiments provide that system 608 may re-try the delivery of data file D' (at step 716) as often as deemed desirable. If necessary, In some embodiments, encrypted data file D' and session key Ks'b could even be delivered on tangible computer readable medium to ensure that receiver 702 gets data file D'. When the transaction does complete successfully, system 608 can record that fact in step 738.

However, if the delivery cannot be successfully accomplished, in some embodiments, sender 602 may want to prove that encrypted data file D' and encrypted session key Ks'b that sender 602 sent at step 632 (i.e., with parcel 400) can yield hash b#D of the unencrypted contents of data file D that receiver 702 sent to system 608 at step 736. Session key Ks'a that sender 602 encrypted with the sender's public key kA allows sender 602 to do so in one embodiment as follows. First, sender 602 can prove that that version of session key Ks'a is the same key as the version of session key Ks'b that was sent to receiver 702. Furthermore, because receiver 702 may not cooperate, sender 602 may want to prove this assertion without access to receiver's private key Kb or any information in the receiver's 702 sole possession.

Thus, sender 602 can decrypt the version of session key Ks'a which sender 602 included in parcel 400 using sender's private key Ka. Then sender 602 can decrypt random data R1'. Using public key kB of receiver 702, sender 602 can also decrypt the random data b#R1 returned to system 608 by receiver 702. And, if the results of the two decryptions agree, then sender 602 has shown that session key Ks'a that successfully decrypted random data R1 matches session key Ks'b that receiver 702 successfully used to decrypt random data R1'. In some embodiments, sender 602 can use sender's decrypted version of session key Ks'a to decrypt data file D' which was sent in parcel 400. Sender 602 can also perform the one-way hash on unencrypted data file D to re-generate hash a#D that was sent in the parcel. Thus, if the hash sender 602 re-generates matches hash a#D sent in parcel 400, sender 602 has proved that sender 602 sent data file D' correctly encrypted with session key Ks'b that was sent along with data file D' in parcel 400.

In some embodiments, receiver 702 may desire to prove that sender 602 sent some information other than what sender 602 claims to have sent. To do so receiver 702 can decrypt session key Ks'b with receiver's private key Kb and use decrypted version of session key Ks (which receiver 702 downloaded) to decrypt encrypted data file D' which receiver 702 also downloaded. The receiver can then 1) encrypt data file D' with receiver's private key Kb 2) perform the one-way hash on data file D which receiver 702 decrypted, or 3) both. The results of these operations can then be compared against the proof of the delivery b#D and b#D' which the receiver provided in step 736. If the results of these operations match results b#D and b#D' stored in step 736, it shows that receiver 702 did receive the information receiver 702 claims to have received.

Figure 10:
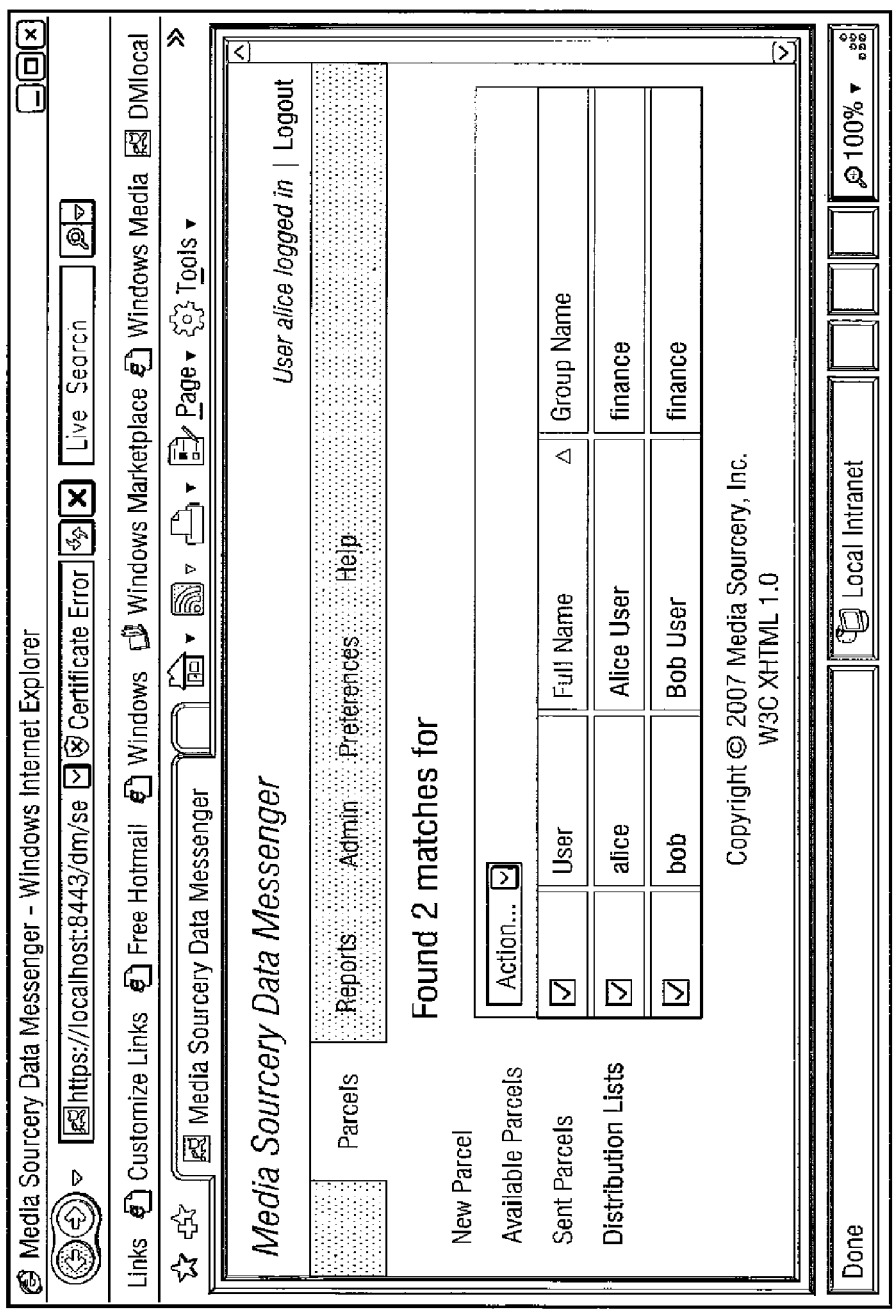
Figure 11:
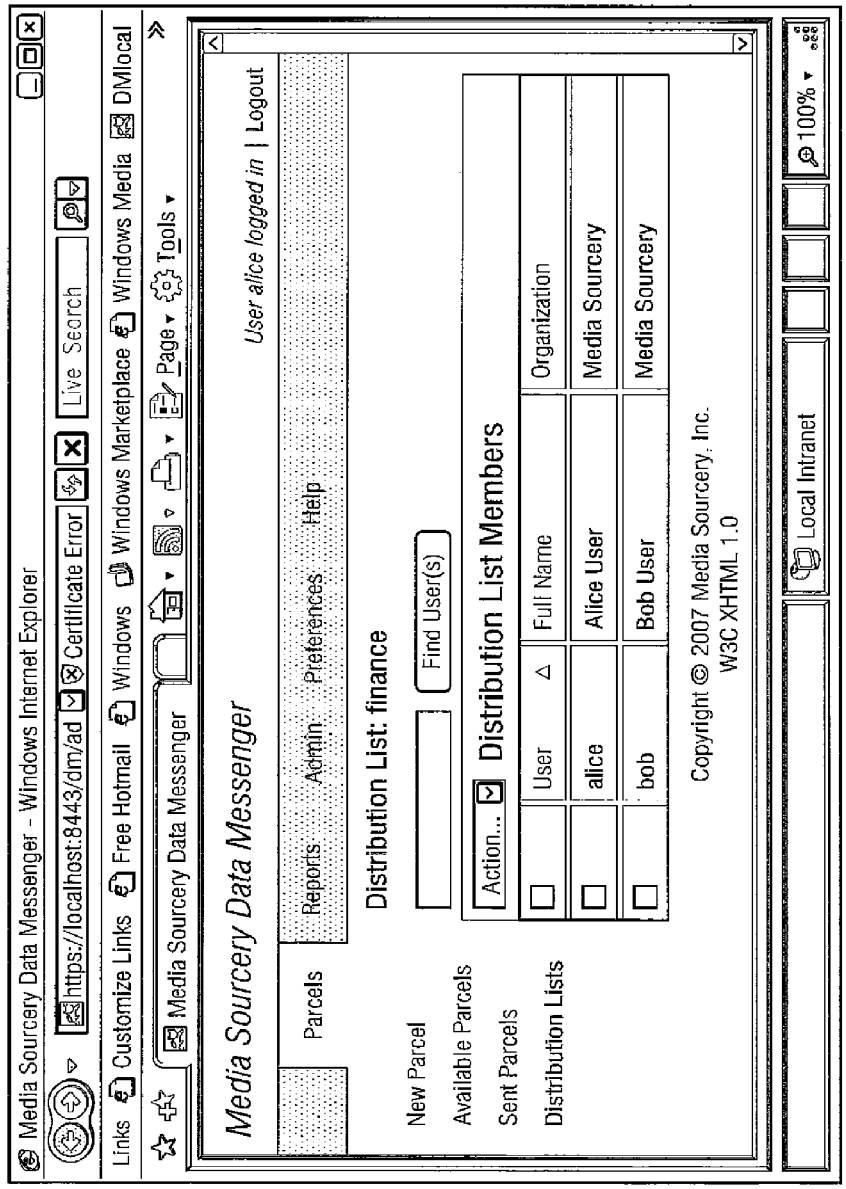
Figure 12:
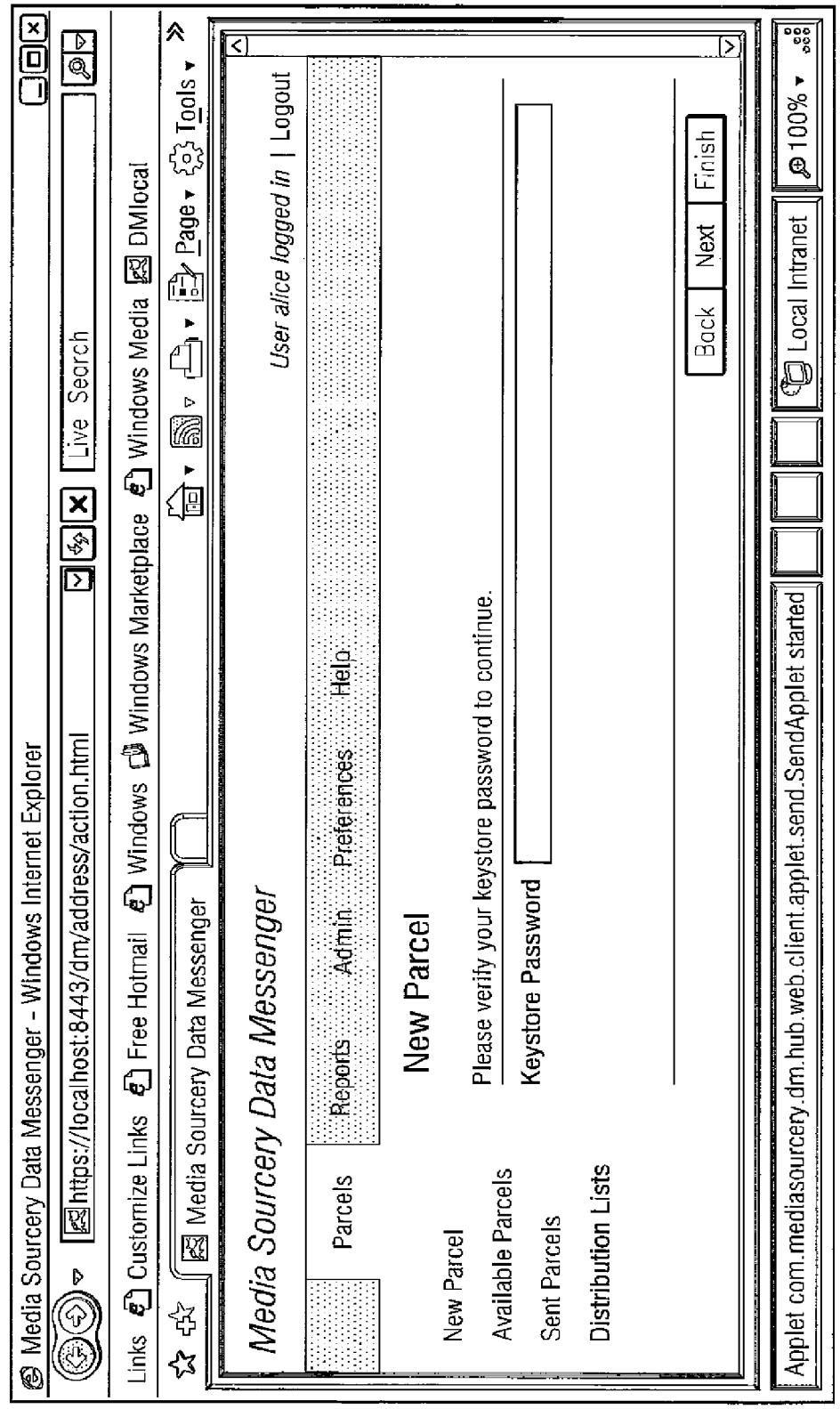

To illustrate how sender 602 (for example "Alice") and receiver 702 (for example "Bob") may conduct a transaction, reference is now made to FIGS. 9-15 which illustrate screenshots of a graphic user interfaces (GUI) for conducting such a transaction. To send a parcel Alice may click on the "Parcels" tab shown in FIG. 9 so that she can have access to parcel creation functionality discussed with reference to FIG. 6. Alice may then click on the "Distribution Lists" link in the left navigation bar of the GUI shown in FIG. 10 to create a distribution list. She can quickly create a distribution list by entering a name in the Distribution List text area and clicking the "Create" button. In the following screen shown in FIG. 11, Alice has created a distribution list called "finance" in this manner. She may then click on the "Find Users" button or enter a search criteria and then click the "Find Users" button. At this point, in some embodiments, Alice will see all users with whom she can securely exchange documents and other information through the embodiments discussed herein. This list of available receivers may be based on group permissions and user roles within the system, enterprise, or other grouping to which Alice may belong. Since, in this embodiment, both Alice and Bob have public and private keys and both have been given send/receive privileges in the finance group, Alice sees the GUI of FIG. 10. Alice may select the users shown by FIG. 10 and may then select the "Add" action from the "Action" menu. The GUI of FIG. 10 shows that the selected users get added to her "finance" distribution list.

Figure 13:
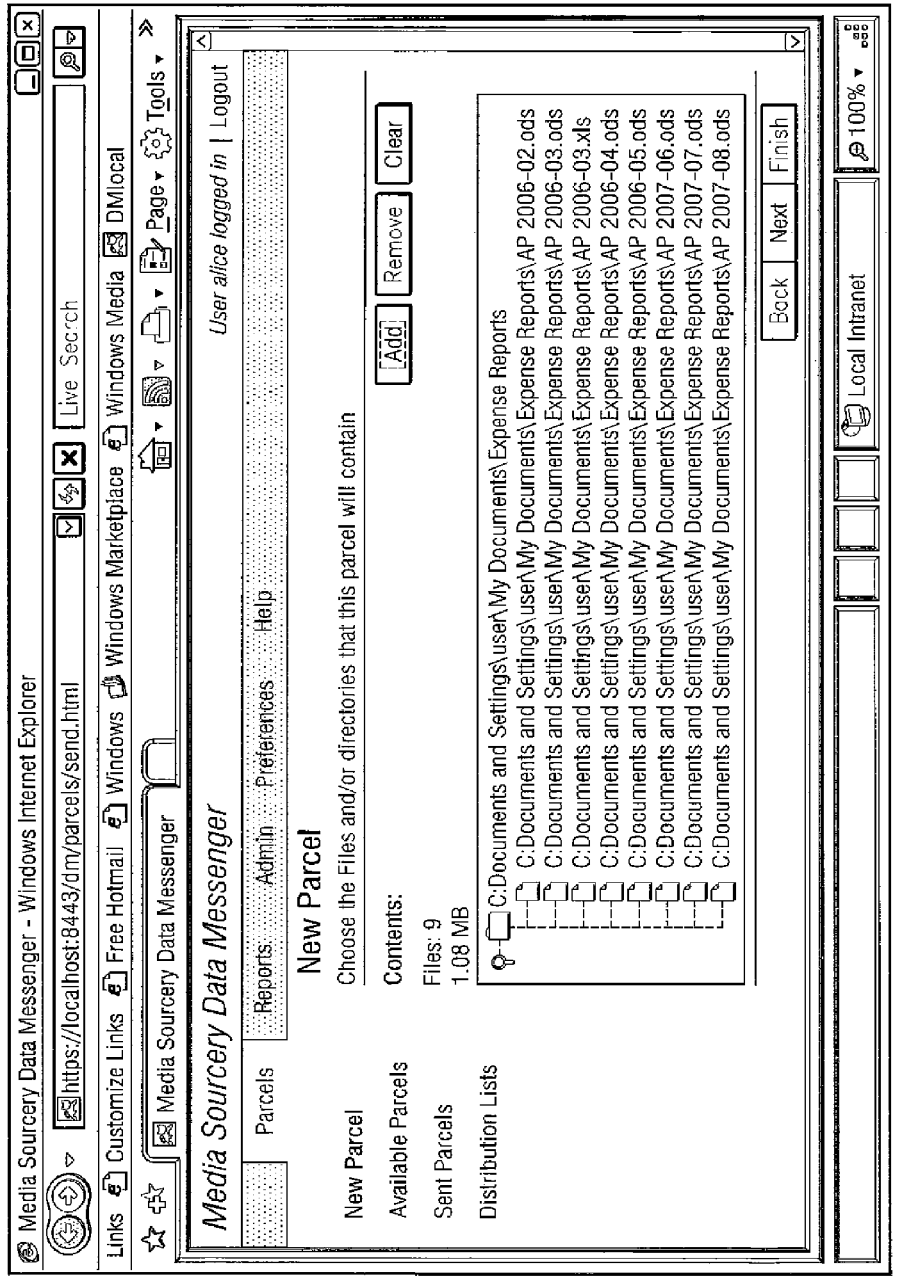
Figure 14:
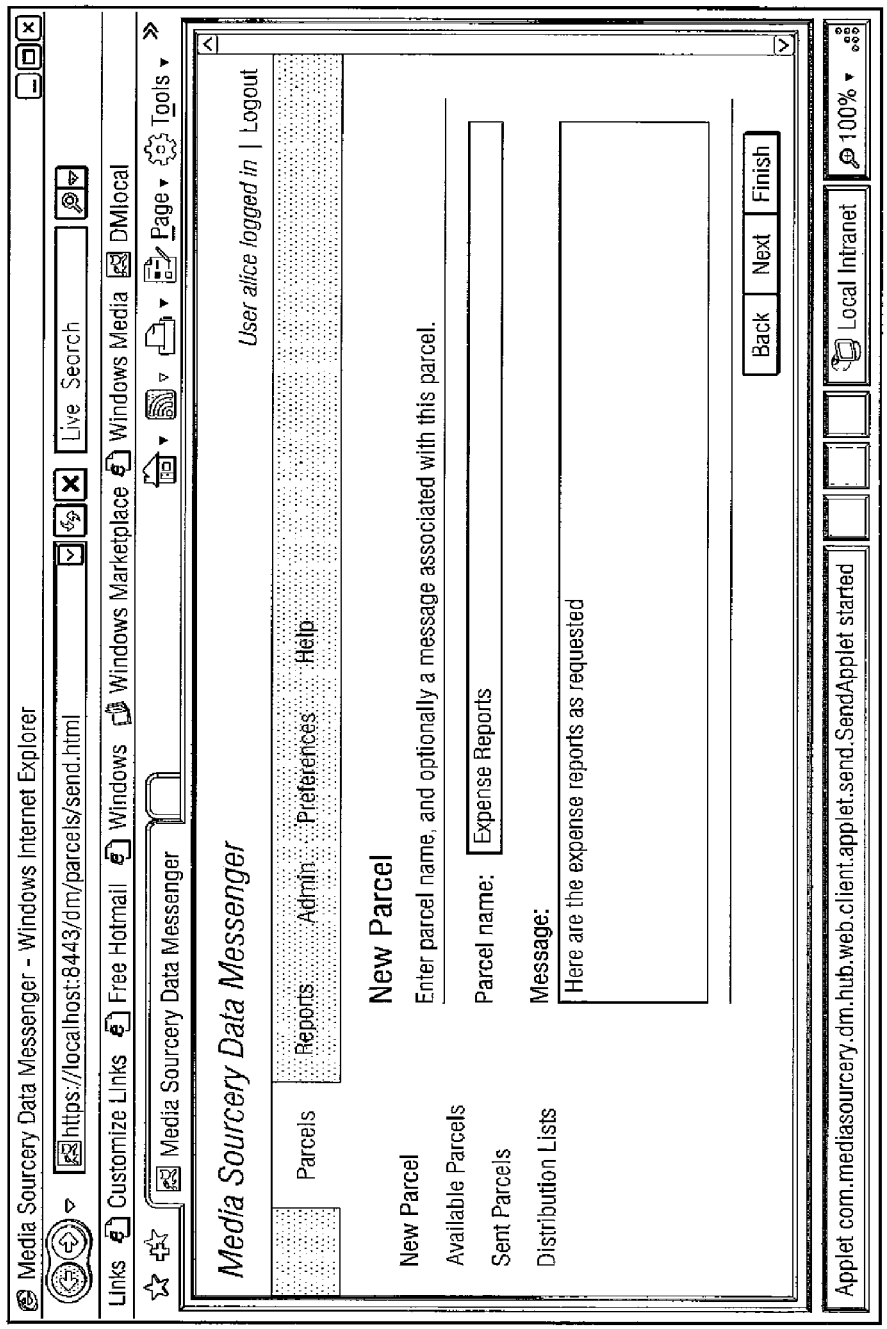
Figure 15:
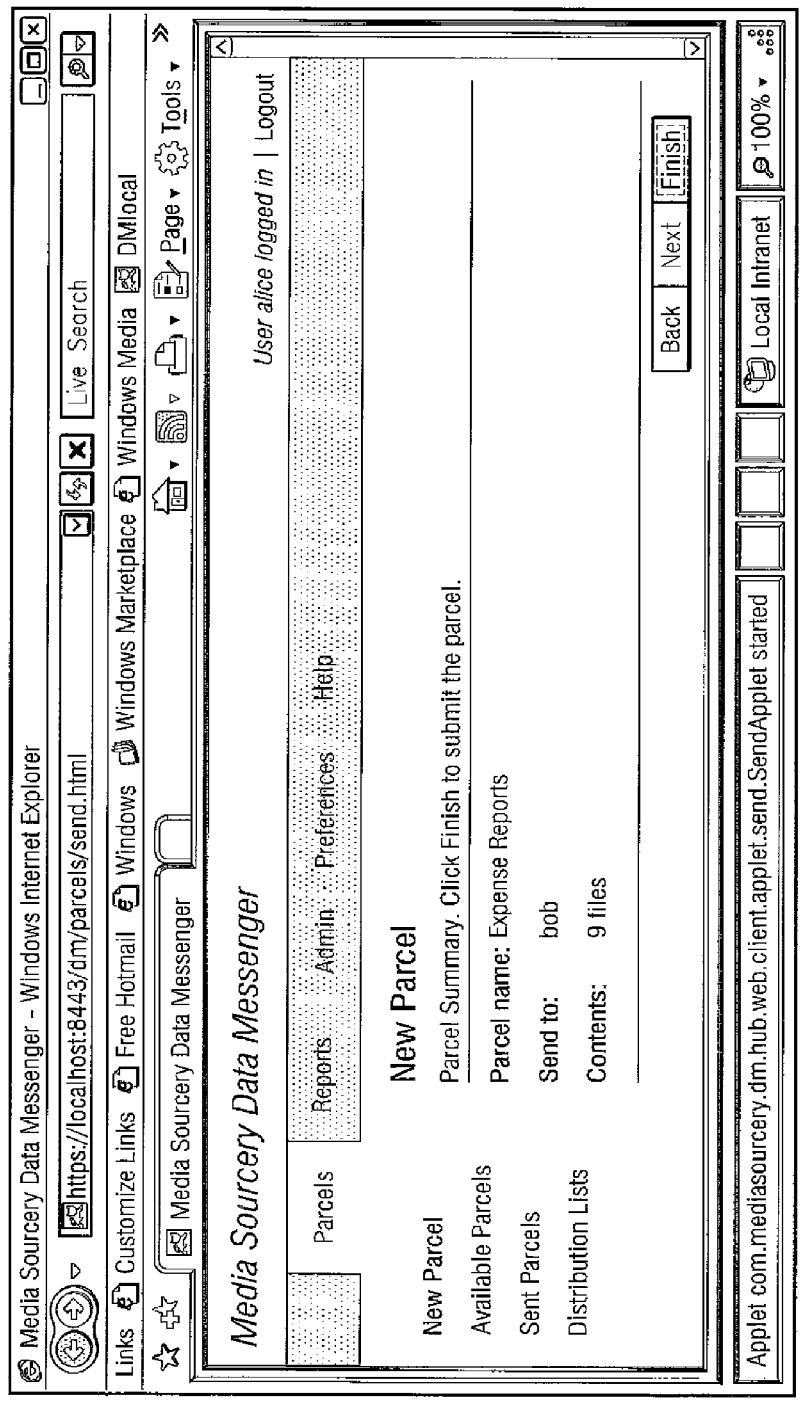

To send a document to Bob, for example, Alice then selects Bob's user id and then selects the "New Parcel" action from the "Actions" menu. See FIG. 11. Alice may then see a "send parcel" applet in her browser. First, she can enter her password to her keystore to unlock her collection of keys in the GUI of FIG. 12. Alice may then click "Next" and get prompted to select the documents (or other information) that she wants to send to Bob as shown in FIG. 13. Alice may then click "Next" and be prompted to enter a parcel name and a message (if she desires to do so) as shown in FIG. 14. Alice can then click "Finish" and have the parcel created and sent by her computer. In the alternative, she can click "Next" and view a summary of the parcel. See FIG. 15. If she is satisfied with her selections, she may then click "Finish" so that the parcel gets sent to Bob. Thus, in this embodiment Alice sent a document to Bob securely by adding him to a distribution list and then selecting his user id to send a parcel to. Furthermore, because the parcel was created and sent in accordance with an embodiment of the disclosure Alice will be able to prove that she sent the message as she claims. To send the message and to render this proof she did not need to get any information from Bob. A similar set of GUI windows may also be provided for Bob so that his secure receipt of the message (and the documents or other information) may be as user-friendly and verifiable as was Alice's secure creation and transmission of the message.

In addition to the foregoing embodiments, the present disclosure provides programs stored on computer readable medium to operate computers and devices according to the principles of the present disclosure. Computer readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, flash memory, firmware, programmable logic, etc.). Furthermore, computer readable media include transmission media (network transmission line, wireless transmission media, signals propagating through space, radio waves, infrared signals, etc.) and server memories. Moreover, computer readable media includes many other types of memory too numerous for practical listing herein, existing and future types of media incorporating similar functionally as incorporate in the foregoing exemplary types of computer readable media, and any combinations thereof. The programs and applications stored on the computer readable media in turn include one or more computer executable instructions which are read by the various devices and executed. Each of these instructions causes the executing device to perform the functions coded or otherwise documented in it. As persons of ordinary skill in the art can appreciate, such programs can take many different forms such as applications, operating systems, Perl scripts, JAVA applets, C programs, compilable (or compiled) programs, interpretable (or interpreted) programs, natural language programs, assembly language programs, higher order programs, embedded programs, and many other existing and future forms which provide similar functionality as the foregoing examples, and any combinations thereof.

Although the disclosure has been described in detail herein with reference to the illustrated embodiments, it should be understood that the description is by way of example only and is not to be construed in a limiting sense. It is to be further understood, therefore, that numerous changes in the details of the embodiment of the disclosure and additional embodiments of the disclosure will be apparent, and may be made by, persons of ordinary skill in the art having reference to this description. It is contemplated that all such changes and additional embodiments are within scope of the disclosure as claimed below.

What is claimed is:

1. A method for non-repudiation communications, comprising:
   at a sender computer, creating a parcel to be delivered to a receiver, wherein creating the parcel further comprises:
      creating a first data file, wherein the first data file is an encrypted version of an original data file and wherein the first data file is encrypted with a session key;
      creating a hash of the original data file;
      creating a first version of the hash of the original data file, wherein the first version of the hash is encrypted with a private key of a sender at the sender computer;
      creating a first version of the session key, wherein the first version of the session key is encrypted with a public key of the sender;
      creating a first session key validation file, wherein the first session key validation file is encrypted with the private key of the sender;
      creating a second version of the session key, wherein the second version of the session key is encrypted with a public key of the receiver;
      creating a second session key validation file, wherein the second session key validation file is encrypted with the session key; and
   sending the parcel containing the first data file, the hash, the first version of the hash, the first version of the session key, the first session key validation file, the second version of the session key, and the second session key validation file from the sender computer to a non-repudiation server computer;
   at the non-repudiation server computer:
      creating an original user validation file before sending any version of the original data file in the parcel to the receiver;
      creating a first version of the original user validation file, wherein the first version of the original user validation file is encrypted with the public key of the receiver;
      sending the first version of the original user validation file to the receiver, wherein the receiver is required to decrypt the first version of the original user validation file and send a decrypted user validation file back to the non-repudiation server computer;
      comparing the original user validation file and the decrypted user validation file; and
      if the original user validation file and the decrypted user validation file differ, stop processing the parcel.

2. A method according to claim 1, wherein the original user validation file and the decrypted user validation file do not differ and wherein at least a portion of the parcel is delivered to the receiver computer, the method further comprising:
   using the first version of the session key and without cooperation from the receiver to prove that the sender sent the first data file correctly encrypted with the session key contained in the parcel delivered to the receiver.

3. A method according to claim 1, wherein the original user validation file and the decrypted user validation file do not differ and wherein at least a portion of the parcel is delivered to the receiver computer, the method further comprising:
   at the receiver computer:
      decrypting the second version of the session key into a third version of the session key using a private key of the receiver; and
      decrypting the second session key validation file using the third version of the session key.

4. A method according to claim 3, wherein the second session key validation file comprises randomly generated data.

5. A method according to claim 1, wherein the first session key validation file comprises randomly generated data.

6. A method according to claim 5, wherein the randomly generated data and the original data file are about same size.

7. A method according to claim 1, wherein the original user validation file comprises random data.

8. A method according to claim 1, wherein creating the parcel further comprises:
   creating an encrypted version of the public key of the receiver, wherein the encrypted version of the public key of the receiver is encrypted with the private key of the sender.

9. A method according to claim 8, wherein the non-repudiation server computer is configured to perform:
   retrieving a first version of the public key of the receiver from a database;
   obtaining a second version of the public key of the receiver, wherein the second version of the public key of the receiver is decrypted from the encrypted version of the public key of the receiver;
   comparing the first version of the public key of the receiver and the second version of the public key of the receiver; and
   if the first version of the public key of the receiver and the second version of the public key of the receiver differ, stop processing the parcel.

10. A method according to claim 1, wherein the non-repudiation server computer is configured to perform:

requesting a crypto library residing at the sender computer to encrypt the first version of the original user validation file with the public key of the receiver.

11. A method according to claim 1, wherein the non-repudiation server computer is configured to perform:
time-stamping the hash of the original data file and the first version of the hash of the original data file.

12. A computer program product comprising at least one non-transitory computer readable medium storing instructions translatable by at least one processor to perform:
creating, at a non-repudiation server computer, an original user validation file before sending any version of an original data file in a parcel to a receiver at a receiver computer, wherein the parcel is created at a sender computer and wherein the parcel contains:
a first data file, wherein the first data file is an encrypted version of an original data file and wherein the first data file is encrypted with a session key;
a hash of the original data file;
a first version of the hash of the original data file, wherein the first version of the hash is encrypted with a private key of a sender at the sender computer;
a first version of the session key, wherein the first version of the session key is encrypted with a public key of the sender;
a first session key validation file, wherein the first session key validation file is encrypted with the private key of the sender;
a second version of the session key, wherein the second version of the session key is encrypted with a public key of the receiver;
a second session key validation file, wherein the second session key validation file is encrypted with the session key; and
an encrypted version of the public key of the receiver, wherein the encrypted version of the public key of the receiver is encrypted with the private key of the sender
creating a first version of the original user validation file, wherein the first version of the original user validation file is encrypted with the public key of the receiver; and
sending the first version of the original user validation file to the receiver, wherein the receiver is required to decrypt the first version of the original user validation file and return a decrypted user validation file;
comparing the original user validation file and the decrypted user validation file; and
if the original user validation file and the decrypted user validation file differ, stop processing the parcel.

13. A computer program product according to claim 12, wherein the receiver is required to decrypt the first version of the original user validation file and return a decrypted user validation file, and wherein the instructions are further translatable by the at least one processor to perform:
comparing the original user validation file and the decrypted user validation file; and
if the original user validation file and the decrypted user validation file differ, stop processing the parcel.

14. A computer program product according to claim 12, wherein the instructions are further translatable by the at least one processor to perform:
retrieving a first version of the public key of the receiver from a database;
obtaining a second version of the public key of the receiver, wherein the second version of the public key of the receiver is decrypted from the encrypted version of the public key of the receiver;
comparing the first version of the public key of the receiver and the second version of the public key of the receiver; and
if the first version of the public key of the receiver and the second version of the public key of the receiver differ, stop processing the parcel.

15. A computer program product according to claim 12, wherein the instructions are further translatable by the at least one processor to perform:
requesting a crypto library residing at the sender computer to encrypt the first version of the original user validation file with the public key of the receiver.

16. A computer program product according to claim 12, wherein the non-repudiation server computer is configured to perform:
time-stamping the hash of the original data file and the first version of the hash of the original data file.

17. A system, comprising:
a non-repudiation server computer communicatively coupled to a sender computer and a receiver computer, the non-repudiation server computer having:
at least one processor; and
at least one non-transitory computer readable medium storing instructions translatable by the at least one processor to perform:
creating an original user validation file before sending any version of an original data file in a parcel to a receiver at a receiver computer, wherein the parcel is created at a sender computer and wherein the parcel contains:
a first data file, wherein the first data file is an encrypted version of an original data file and wherein the first data file is encrypted with a session key;
a hash of the original data file;
a first version of the hash of the original data file, wherein the first version of the hash is encrypted with a private key of a sender at the sender computer;
a first version of the session key, wherein the first version of the session key is encrypted with a public key of the sender;
a first session key validation file, wherein the first session key validation file is encrypted with the private key of the sender;
a second version of the session key, wherein the second version of the session key is encrypted with a public key of the receiver;
a second session key validation file, wherein the second session key validation file is encrypted with the session key; and
an encrypted version of the public key of the receiver, wherein the encrypted version of the public key of the receiver is encrypted with the private key of the sender
creating a first version of the original user validation file, wherein the first version of the original user validation file is encrypted with the public key of the receiver;
sending the first version of the original user validation file to the receiver, wherein the receiver is required to decrypt the first version of the original user validation file and send a decrypted user validation file back to the non-repudiation computer;
comparing the original user validation file and the decrypted user validation file; and
if the original user validation file and the decrypted user validation file differ, stop processing the parcel.

18. A system according to claim 17, wherein the first session key validation file comprises randomly generated data.

19. A system according to claim 17, wherein the original user validation file comprises random data.

20. A system according to claim 17, wherein the instructions are further translatable by the at least one processor to perform:
- retrieving a first version of the public key of the receiver from a database;
- obtaining a second version of the public key of the receiver, wherein the second version of the public key of the receiver is decrypted from the encrypted version of the public key of the receiver;
- comparing the first version of the public key of the receiver and the second version of the public key of the receiver; and
- if the first version of the public key of the receiver and the second version of the public key of the receiver differ, stop processing the parcel.

\* \* \* \* \*